(12) United States Patent
Chappell et al.

(10) Patent No.: US 7,087,105 B1
(45) Date of Patent: Aug. 8, 2006

(54) WATER ENHANCEMENT FIRE RETARDANT

(76) Inventors: Harry H. Chappell, 1580 Vicenza Dr., Sparks, NV (US) 89434; Darius Chung, 1550 Vicenza Dr., Sparks, NV (US) 89434; Robert R. Swinney, 840 Bowman Dr., Reno, NV (US) 89503

( * ) Notice: Subject to any disclaimer, the term of this patent is extended or adjusted under 35 U.S.C. 154(b) by 0 days.

(21) Appl. No.: 11/153,449

(22) Filed: Jun. 16, 2005

(51) Int. Cl.
*C09K 21/02* (2006.01)
*C04B 14/08* (2006.01)
*C04B 14/14* (2006.01)

(52) U.S. Cl. ............... 106/18.12; 106/15.05; 106/18.11; 106/286.5; 106/287.17; 106/483; 106/484; 252/601

(58) Field of Classification Search ............. 106/15.05, 106/18.11, 18.12
See application file for complete search history.

(56) References Cited

U.S. PATENT DOCUMENTS

| | | |
|---|---|---|
| 4,101,485 A | 7/1978 | Brooks et al. |
| 5,132,030 A | 7/1992 | Mars |
| 5,154,235 A | 10/1992 | Renaker, Jr. et al. |
| 5,509,485 A | 4/1996 | Almagro |

OTHER PUBLICATIONS

"WATERSAVER: Specifications of Lassenite Type N", http://www.h2o-savers.com/iframes/spec.html (Sep. 15, 2005).*

"Calcined Pozzolan" (4 pages), http://www.westernpozzolan.com/techLassMSDS.htm (Sep. 15, 2005).*

"Test Report Comparison of Pozzolan "N" vs. Fly Ash Class "F"", http://www.westernpozzolan.com/vsflyash.htm (Sep. 15, 2005).*

"Lassenite-SR Uses and Benefits," Four pages printed from the Western Pozzolan Corp. Internet Website, www.westernpossolancorp.com/lassBen.htm, on Nov. 18, 2004.

* cited by examiner

*Primary Examiner*—Anthony J. Green
(74) *Attorney, Agent, or Firm*—Richard C. Litman

(57) ABSTRACT

An air-droppable wildfire retardant composition including Lassenite N pozzolan is a natural siliceous (amorphous) mineral, consisting of the layers of diatoms and volcanic tuffs of Northern California's Cascade Range. The Lassnite pozzolan is mixed with a thickener such a Bentonite clay, a measured volume of water forming a slurry-type mixture capable of suspending the particles of pozzolan in a mixture having a viscosity sufficient to avoid solids separation. The inventive fire retardant contains substantially three innocuous ingredients which have no harmful effects to the atmosphere, plant, or animal life.

13 Claims, No Drawings

WATER ENHANCEMENT FIRE RETARDANT

BACKGROUND OF THE INVENTION

1. Field of the Invention

The present invention relates to fire retardants. More particularly, the present invention relates to air-droppable fire retardants for wildfires.

2. Description of the Related Art

A variety of fire retardant compositions useful to prevent or combat the spread of wildfires have been proposed. Generally such compositions contain a fire retardant salt and aqueous liquid vehicle and various additives including thickeners to improve the aerial drop a fuel coverage characteristics of the composition. Typical among such thickeners are natural and synthetic gums. Commonly used gum-thickened high viscosity fire retardant compositions include ammonium sulfate and monoammoniium phosphate and may contain diammonium phosphate and ammonium polyphosphate, all of which are toxic, effecting the lives of fishes, birds, animals and possibly humans due to high potential of their dispersion into lakes, rivers, and streams which may be part of the public drinking water system. Attendant to their use, effective and efficient monitoring system must be in place to assure the public that levels of safety and acceptability in drinking water are not exceeded. Also, cultivation of land areas may be delayed due to the presence of such resulting from the application of these fire retardants. Such fire retardant compositions are harmful to the environment, causing pollution of streams, and fail to significantly help in reforestation or ground cover growth to minimize future erosion of burned areas upon receiving rainfall.

It would be desirable to provide an air-droppable wildfire suppressant which is effective and similar in viscosity to the present gum thickened high viscosity fire retardants resulting in desirable air-drop characteristics and the coating and insulating various fuel materials to keep them from reaching their ignition temperature. It would further be desirable to provide a fire retardant which does not require the mixing of chemicals potentially harmful to personnel and equipment. This would include the absence of toxic or hazardous chemical vapors from the fire retardant in contact with heat from flames, producing a hazardous environment for fire fighting personnel. It would further be desirable that the use of the fire retardant avoids toxic effects on wildlife and pollution of streams, and is beneficial to the environment in retaining water from subsequent rain, encouraging re-growth of ground cover and forests, minimizing erosion of burned areas. It would be further desirable if the wildfire retardant were nontoxic so as to allow immediate cultivation of burned land, thus avoiding erosion.

None of the above-mentioned presently used fire retardant compositions, taken either singly or in combination, is seen to describe the instant invention as claimed. Thus, a water enhancement fire retardant solving the aforementioned problems is desired.

SUMMARY OF THE INVENTION

The water enhancement fire retardant comprises a viscous slurry useful in airdrop applications to forest and wild land fires which is inexpensive and environmentally friendly and non-toxic. The slurry has the advantage of being able to provide a coating for vegetation which remains on the plants and surrounding land which retains water when applied to the wild lands in the path of the fire, thus denying dry fuel to the fire. The coating is non-toxic to plants, animals, and firefighters, both in its applied state and when exposed directly to flames of the fire. The coating remaining in the burn area enhances the return of vegetation cover by retaining water, as applied and from rainfall, thus reducing erosion from rain and wind and the resulting damage to streams and aquatic life therein.

The inventive fire retardant slurry contains natural Lassenite pozzolan including class N (natural), either raw or calcined, a thickener, such as Bentonite clay or gums, and water mixed into a slurry. The bulk density viscosity is preferably about 1800 centipoises which is useful for containing all types of wild-land fires, but may vary between about 1500 centipoises, which is most useful for grass and brush-type fires, and about 2100 centipoises, which is best suited for heavily wooded-type fires. Although the inventive firefighting slurry is particularly useful in airdrop operations, it may be delivered by other means such as land based pumping units.

These and other features of the present invention will become readily apparent upon further review of the following specification.

DETAILED DESCRIPTION OF THE PREFERRED EMBODIMENTS

The present invention is an air-droppable wildfire retardant which is not only effective in containing wildfires, but is environmentally beneficial in encouraging the re-growth of vegetation cover while avoiding the pollution of natural streams.

Lassenite Type N pozzolan is a natural siliceous (amorphous) mineral, consisting of the layers of diatoms and volcanic tuffs of Northern California's Cascade Range. Lassenite Type N Pozzolan conforms to ASTM c-618, Federal Specifications #SS-C-1960/5 and DSA-CAN-A266-3M (Canadian) specifications for Type N (Natural) Pozzolan and meets specification requirements of the NRC for use on the Nuclear Reactor Program, California Department of Water Resources, Corp. of Engineers, U.S. Water and Power Resources Services, Cal Trans, Pacific Gas & Electric, Idaho Poser and Arizona Public Service for hydraulic structures and power plants, Bechtel Corporation for hydraulic structures, and municipalities for waste water treatment and transportation facilities.

Most deposits had their origin during a period of intense volcanic activity. Volcanic eruptions sent clouds of volcanic ash into the atmosphere where prevailing winds carried the ash in an easterly direction, depositing it mostly on barren terrain and in warm fresh and salt water lakes, basins, and various sinks throughout the Western part of the United States. These diatoms have been identified from drilling logs and core samples when the extent of these deposits was first determined. Thousands of years of alternating deposits of the skeletal diatoms and air dropped volcanic ash, coupled with similar types of minerals being eroded into rivers and streams were eventually deposited into the mix of skeletal diatoms and volcanic ash on the bottom of shallow lakes and basins. Among these unique and natural phenomena were three necessary conditions that produce a relatively pure natural (Type N) pozzolan. These three important environmental conditions are: (1) the yearly average temperature of the lake water must be warm enough to support a continual bloom and demise of the diatoms; (2) the pH of lake water must remain relatively constant, ranging between a pH of 6.0 to 8.0; and (3) the soluble mineral content of the lake water and its composition must remain relatively constant.

If these conditions are met, the finely divided particles of aluminum silicates that make up the bulk of volcanic ash will tend to combine with and replace the bony skeleton structure of the diatoms with a unique, hard, non-crystalline, amorphous silica compound. The pozzolanic property in the final deposit of the silica compounds depends upon the competitive affects due to the concentration of different metallic ions present in the solution matrix of the lakes water and their capability of producing a highly non-crystalline (amorphous) deposit with remarkable chemical and physical uniformity throughout.

The purity and uniformity of the chemical composition of the Lassenite N pozzolan has been determined and is virtually free of foreign or toxigenic matter. This is demonstrated by its high chemical concentration of amorphous silica and the low concentration of metallic oxides.

Another important property regarding the Lassenite pozzolan is the ability of amorphous silica to silicify the skeletal structure of the unicellular diatoms, which form "Kieselguhr", a loose or porous diatomite mineral commonly known as Diatomaceous Earth. The porous property of the diatomite mineral and the small capillaries throughout the mineral provides a capacity to be used as an excellent absorbent. The porous property of the mineral not only has an ability to absorb aqueous solutions and water, but organic solvents and oils as well.

The tendency of this mineral to absorb and retain water without leaching has been discovered to be useful as an ingredient in a fire retardant, using the finely divided particles of Lassenite pozzolan mixed with a measured volume of water forming a slurry-type mixture capable of suspending the particles of pozzolan in a mixture having a viscosity sufficient to avoid solids separation. The amorphous silica mineral structure found in the Lassenite pozzolan is distinct from the non-pozzolan, crystalline structure of the silicious material found in clay minerals. Crystalline structure silicious material does not have the water retaining and coating characteristics desirable in an air-droppable fire retardant as discussed below.

The fire retardant using the pozzolanic slurry has the following attributes: (1) no toxic affect cause by the evaporation or vaporization of the liquid slurry to the environment when airdropped by air tankers; (2) no toxic or hazardous chemical vapors from the fire retardant itself, in contact with heat from flames, that could produce a hazardous environment for fire-fighting personnel; (3) the amorphous silica slurry has the ability to coat and insulate the vegetation acting as fuel from reaching ignition temperature; and (4) the neutral affect of the retardant, with a pH of 7, has little or no effect while air-dropped into the environmental with regard to retarding the regeneration of the soil and the re-growth of plant life.

A typical Lassenite type N pozzolan has a composition having $SiO_2$ of 70.5% (amorphous), $Fe_2O_3$ of 6. %, and $Al_2O_3$ of 17.8% for a total oxides number of 94.4%. Other components include CaO of 2.3%, MgO of 0.8%, $SO_3$ of 0.6%, $Na_2O$ & $K_2O$ of 0.2%, and having a pH of 6.9. Weight loss on ignition is 0.2%. Physical characteristics include a specific gravity of 2.36 and a bulk density of 38.0 pounds per cubic foot, loose).

The inventive fire retardant contains substantially three innocuous ingredients which have no harmful effects to the atmosphere, plant, or animal life. These ingredients are (1) Lassenite Mineral, either raw or calcined, (2) a clay thickener, and (3) water.

In use, predetermined amounts of ingredients Lassenite Mineral and clay thickener are dry mixed, stored, and transported in sacks to the end user's site. At the site, the dry mix and a predetermined quantity of water are batch mixed into an innocuous slurry until the required "Bulk Density" is acquired. The slurry is then loaded on an aircraft and dropped over an area designated for fire suppression. The weight percent ratio of the dry mix is on the order such that the Lassenite Mineral is present in the amount of about 75 wt. %, and clay thickener is present in the amount of about 25 wt. %.

The diatomaceous and amorphous properties of the Lassenite Mineral material results in an environmentally friendly fire suppressant having high water absorption rate and extremely high moisture retention rate. The material is cost-effective as compared to presently used fire suppressants, as the materials are readily mined and processed with minimum cost. The materials need not be shipped long distances since they are indigenous to Western areas prone to wildfires.

EXAMPLE

A series of tests were done, repeated, and recorded, resulting in an overall "Preferred" mixture and two other targeted mixtures based on Bulk Density Viscosity, the results being shown in the following Table 1.

TABLE 1

Compositions of Lassenite Pozzolan Fire Retardant in wt. % for Target Viscosities.

| Bulk Density Viscosity (centipoises) | Lassenite (grams) | Bentonite Clay Thickener (grams) | Water (grams) | Total Weight (grams) | Comments |
|---|---|---|---|---|---|
| 1500 | 549.3 13.4% of mixture | 183.2 4.5% of mixture | 3353.5 82.1% of mixture | 4086 100% of mixture | Best suited for Grass and Brush-type fires |
| 1800 | 659.2 16.1% of mixture | 219.8 5.4% of mixture | 3207.0 78.5% of mixture | 4086 100% of mixture | Preferred for containing all-types of fires |
| 2100 | 769.1 18.8% of mixture | 256.4 6.3% of mixture | 3060.5 74.9% of mixture | 4086 100% of mixture | Best suited for heavily wooded-type fires |

The particle size of the Lassenite pozzolan is −32 mesh. The above tests were repeated multiple times with minor variations in resultant viscosity for a given composition.

The term "Bulk Densities" is used as a term of art in airdropped fire retardants and the generally recommended bulk densities range from 1000 and 2200 centipoises for effective and efficient wildfire fighting in all group/type wild land fires. However, the preferred range is between 1200 and 1800 centipoises, thus resulting in more cost-effective results. Bulk densities directly relate to percent of the product mix, in this case Lassenite pozzolan and water, the main ingredients of the fire retardant. The environmentally friendly clay thickener functions to maintain the products of the mixture in suspension until applied and to decrease the overall weight of the slurry. Other environmentally friendly thickeners useful in the inventive fire retardant are gum thickeners and may be used as alternative to the Bentonite clay, but are, in general, more costly. Thus, the preferred thickener is a clay thickener.

The Lassenite Pozzolan of −32 mesh is presently available as a by-product of present mineral sizing product requirements and is this cheaply attained and readily available. The clay thickener is a cost effective, off-the-shelf material, readily available in required amounts It is to be understood that the present invention is not limited to the embodiments described above, but encompasses any and all embodiments within the scope of the following claims.

We claim:

1. A fire retardant slurry composition, comprising:
   Lassenite N pozzolan, said Lassenite N pozzolan is present in the range of about 13.4 wt. % to about 18.8 wt. %;
   a clay thickener, said clay thickener is present in the range of about 4.5 wt. % to about 6.3 wt. %; and
   water said water is present in the range of about 82.1 wt. % and about 74.9 wt. %.

2. The fire retardant slurry composition of claim 1, wherein said clay thickener is Bentonite clay.

3. The fire retardant slurry composition of claim 1, wherein said Lassenite N pozzolan is present in an amount of about 16.1 wt. %, said clay thickener is present in an amount of about 5.4 wt. %, and said water is present in an amount of about 78.5 wt. %.

4. The fire retardant slurry composition of claim 3, wherein said clay thickener is Bentonite clay.

5. The fire retardant slurry composition of claim 1, mixed in relative amounts so as to form a slurry having a bulk density viscosity of from about 1500 centipioises to about 2100 centipoises.

6. The fire retardant slurry composition of claim 5, said clay thickener being Bentonite clay.

7. The fire retardant slurry composition of claim 6, said slurry having a bulk density viscosity of about 1800 centipoises.

8. A fire retardant premix composition for mixing with water to form a slurry comprising:
   Lassenite N pozzolan, said Lassenite N pozzolan is present in the amount of about 75 wt. %; and
   a thickener, said thickener is present in the amount of about 25 wt. %.

9. The fire retardant premix composition of claim 8, wherein said thickener is a clay.

10. The fire retardant premix composition of claim 9, wherein said clay thickener is Bentonite clay.

11. A method for producing a fire retardant composition comprising the steps of:
    mixing Lassenite N pozzolan with a clay thickener to form a mixture;
    wherein said Lassenite N pozzolan comprises about 75 wt. % of the mixture of Lassenite N pozzolan and clay thickener; and
    adding water and mixing with said Lassenite N pozzolan and clay thickener to form a slurry having a having a bulk density viscosity of from about 1500 centipoises to about 2100 centipoises.

12. The method of claim 11, wherein said clay thickener is Bentonite clay.

13. The method of claim 12, wherein said water is added to form a slurry having a bulk density viscosity of about 1800 centipoises.

* * * * *